Aug. 15, 1933. B. H. CHISHOLM 1,922,616
CALIBRATING MEANS FOR OIL GAUGES
Filed July 5, 1928
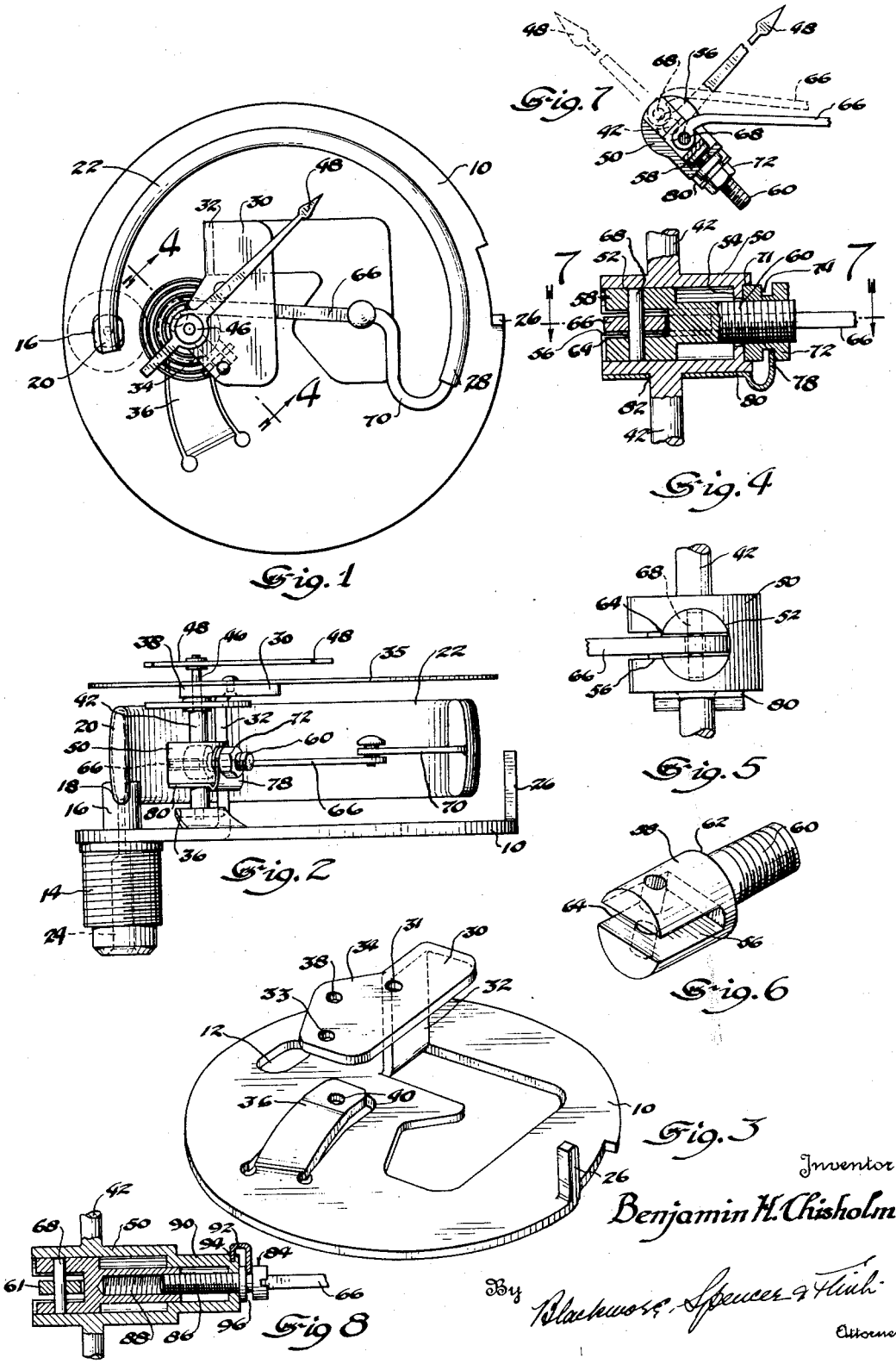

Patented Aug. 15, 1933

1,922,616

UNITED STATES PATENT OFFICE 1,922,616

CALIBRATING MEANS FOR OIL GAUGES

Benjamin H. Chisholm, Flint, Mich., assignor to A C Spark Plug Company, Flint, Mich., a Company of Michigan Application July 5, 1928. Serial No. 290,518

13 Claims. (Cl. 73—109)

This invention relates to gauge mechanisms of the Bourdon tube type, and especially to a means for mounting and calibrating the gauge mechanism.

In gauges of the Bourdon tube type, it is inevitable that the Bourdon tubes will have a varying stiffness, as a result of which different tubes will move varying amounts under equal degrees of pressure. It is therefore necessary to provide some means to increase or decrease the movement of tubes accordingly as they are strong or weak by varying the leverage which moves the pointer shaft.

In prior constructions, it has been customary to bend the linkage of the tube by hand a certain amount, but due to the great accuracy required of a gauge of the Bourdon tube type in registering pressures, it has been found that this method of calibrating has been unsatisfactory.

The present invention aims to eliminate this inaccuracy by providing a calibrating means which is capable of varying the swing of the pointer shaft through very small degrees.

The object of the invention is, therefore, to provide a gauge of the Bourdon tube type which will have a simple link movement connecting the free end of the tube to the indicating pointer, and to provide means whereby a very accurate change and small variation may be made by the calibrating mechanism in the leverage exerted by the Bourdon tube through the link.

The object of the invention is accomplished by providing the shaft which swings the pointer with an enlarged cylindrical portion along its length, and providing this enlarged portion with a bore or opening. Through the bore there is passed a calibrating screw having a reduced end which is threaded and has a grooved adjusting nut applied thereto. A spring member fastened to the pointer shaft has a bent end fitting in the groove to hold the nut stationary and the parts in adjusted position.

Both the enlarged portion of the shaft and the nonthreaded end of the calibrating screw have registering slots in which there is positioned the end of a link connected to the Bourdon tube. The link is pivoted to the calibrating screw, and by turning the nut to cause the screw to move in one direction or the other, the pivotal point of the linkage may be thrown nearer, or projected farther away from the axis of the shaft or at either side thereof, thereby calibrating the gauge in accordance with the stiffness of the tube and the direction of swing of the pointer.

As a modification a threaded bolt may be used in place of the adjusting nut and this bolt screwed into a threaded opening in the calibrating screw. A U-shaped clip fitting in grooves in the bolt head and enlarged portion of the pointer swinging shaft holds the parts in adjusted position.

It is also an object of the invention to provide a combined back and supporting plate to form suitable supports for the gauge operating mechanism.

Referring to the drawing:

Figure 1 shows a plan view of the gauge mechanism with the casing removed for purposes of clearer illustration.

Figure 2 is a side view of the structure shown in Figure 1.

Figure 3 is a perspective view of the back plate.

Figure 4 is a section on the line 4—4 of Figure 1.

Figure 5 is a view of the structure of Figure 4 looking from the left.

Figure 6 is a perspective view of the calibrating screw.

Figure 7 is a view on a reduced scale on the line 7—7 of Figure 4, showing in full and dotted lines the two extreme positions of the screw.

Figure 8 is a modification of the structure shown in Figure 4.

Referring to the drawing, the numeral 10 indicates the back or base plate provided with an opening 12 for the reception of a boss or inlet stud 14, having reduced portion 16 which projects through the plate 10 and is slotted as at 18 to receive the end 20 of the Bourdon tube 22. The inlet stud 14 is bored as shown at 24 to permit communication with the inside of the Bourdon tube 22.

Substantially diametrically opposite the opening 12, a finger or stop pin 26 is bent from the edge of the plate 10. The purpose of this finger or pin is to limit the expansion of the Bourdon tube in case the tube should be subjected to excessive pressures. If excessive pressure exists within the tube 22, the end 28 will strike against the finger 26 and prevent further expansion.

Pressed from the plate 10 is the secondary or supporting plate 30, integrally united with the plate 10 by means of the leg 32. A plate 30 has a V-shaped extension 34, the purpose of which will later be described. The supporting plate 30 is also provided with openings 31 and 33 the purpose of which is to secure the dial 35 in place.

Below the V-shaped extension 34, the base plate 10 has pressed or punched therefrom, the ear or lug portion 36, for cooperation with the superposed V-shaped extension 34. The V-shaped extension 34 is provided with an opening 38, while the lug 36 is provided with an opening 40.

Mounted between the extension 34 and the lug 36 within the openings 38 and 40 is a pointer swinging shaft 42 having its upper end reduced as shown at 46 and on which end there is rigidly mounted the pointer 48. At substantially the mid portion of the shaft 42, an enlarged cylindrical portion 50 is provided. This portion 50 is provided with a bore 52 having a flange 54 at its end. At one side of the cylindrical portion 50 there is a slot 56, the purpose of which will later be described.

Extending within the bore 52 of the enlarged portion 50 is the calibrating screw 58 which has a reduced threaded end portion 60 extending beyond the cylindrical portion 50. The calibrating screw is provided with a slot 64 which registers with the slot 56 in the cylindrical portion 50. Positioned within the slot 56 of the cylindrical portion 50, and the slot 64 of the calibrating screw 58 is a link 66, having a connection with the calibrating screw by means of a pivot pin 68. The opposite end of the link 66 is fastened to an arm 70 secured in any suitable way to the end 28 of the Bourdon tube 22.

Applied to the threaded shank 60 of the calibrating screw 58 within a recess 71 in the cylindrical portion 50, is a nut 72 resting on the flange 54 and having an annular groove 74 in its periphery. Extending within the groove 74 is the bent end 78 of a spring member 80 secured as at 82 to the shaft 42 and cylindrical portion 50. The purpose of the spring 80 is to hold the nut 72 in a definite position.

The bore 52 is of such a length as to allow the screw 58 to move the pivot pin 68 from one side of the axis of the shaft 42 to the other. This is shown in Figure 7, in which the dotted position of the pointer 48 and pin 68 shows the pin on one side of the axis of the shaft 42, and the pull line position shows the same parts on the other side. With the present calibrating mechanism it is therefore possible to obtain a reversed reading of the pointer; i. e. if the pointer swings clockwise when in the dotted line position of Figure 7, it will swing counter clockwise when in the full line position.

From an inspection of Figures 1 and 2, it will be noted that the axis of the bore 52 in the cylindrical portion and of the calibrating screw 58 extend in a direction which will give a substantially direct pull on the end 28 of the Bourdon tube through the link 66 and arm 70 when the nut 72 is turned.

From the description and arrangement of the parts, it will be apparent that as the nut 72 is turned so as to cause the calibrating screw 58 to pass to the right as shown in Figure 4, the pivot 68 of the link 66 will be drawn closer to the axis of the shaft 42 and thereby bring about a relatively larger angle of action or movement of the pointer caused by the expansion of the Bourdon tube 22 under a given pressure. If the screw is turned so as to cause the pivot 68 to move to the left as shown in Figure 4, the expansion of the Bourdon tube 22 under the same pressure will give a lesser angular movement to the shaft 42, due to the fact that the arc of action although substantially of the same chord length as the previous arc, will subtend a smaller angle, for the arc of action is now positioned much farther away from the axis of the shaft 42.

Referring to Figure 8, it will be seen that instead of the nut 72 use may be made of a bolt 84, the shank 86 of which is threaded into a bored portion 88 of the calibrating screw 58. In this species the enlarged cylindrical portion 50 has an extension 90 which is preferably integral but may be formed of a separate piece and secured to the enlarged portion 50 in any suitable way such as by screw threading, welding, or forced fit. A U-shaped clip 92 fits in an opening 94 (which may be a peripheral groove) in the extension 90 and in a groove 96 in the head of the bolt 84 to hold the parts in their adjusted relation.

I claim:

1. In a gauge of the Bourdon tube type, a pointer shaft, an enlarged part on said shaft having an opening, a screw threaded member passing through said opening, said enlarged part and member having registering slots, a link having operative engagement with the Bourdon tube and pivoted in the slot of the member, and a nut on the threaded member to adjust the member and thereby calibrate the gauge.

2. The structure of claim 1, and means on said shaft to hold the adjusting parts in set position.

3. In a gauge having a pointer shaft, means for calibrating the gauge comprising an enlarged part on the shaft, said enlarged part having an opening, a threaded member extending through the opening in said enlarged part, a nut on said threaded member to adjust the member, and means secured to said shaft to hold said nut in adjusted position.

4. In a Bourdon tube gauge having a pointer shaft, means for calibrating the gauge comprising an enlarged part on the shaft, a threaded member extending through an opening in said enlarged part, a link connected to said threaded member and the Bourdon tube, said enlarged portion and said threaded member each having a slot for the reception of the link, and a nut on the threaded member to adjust the member.

5. In a gauge of the Bourdon tube type, a pointer shaft, an enlarged part on said shaft having an opening, a screw threaded member passing through said opening, said enlarged part and member having registering slots, a link having operative engagement with the Bourdon tube and pivoted in the slot of the member, a nut on the threaded member to adjust the member and thereby calibrate the gauge, said nut having a groove, and a spring member on said shaft having its end engaging in said groove to hold the parts in adjusted position.

6. In a means for calibrating a gauge having pressure responsive means, a pointer mounted to move on an axis, and means connected with the pressure responsive means and the pointer to move the pointer, said moving means including a threaded adjusting member having a pivot member thereon and a nut engaging said threaded member and capable of being turned to move said threaded member to move said pivot member across the axis of movement of the pointer to cause said means to change the direction of swing of the pointer in response to the same movement of the pressure responsive means.

7. In a means to calibrate a gauge having pressure responsive means, a pointer mounted on a shaft, and means connected with the pressure responsive means and the shaft to move the pointer, said moving means including a threaded adjusting member having a fork and having a link pivoted in the fork and a nut engaging said threaded member and capable of being turned to move said threaded member to move the pivot of said link across the axis on which the pointer moves to cause said means to change the direction of swing of the pointer in response to the same movement of the pressure responsive means.

8. In an adjusting means for a gauge having a pressure responsive means, a pointer, a shaft on which the pointer is mounted, means connecting the pressure responsive means and shaft to move the shaft, said means including a pivotal connection and means passing through the shaft to adjust the moving means to cause the pointer to change its direction of swing in response to the same movement of the pressure responsive means, said means passing through the shaft being capable of moving the connection across the shaft to obtain adjustments for all positions of the connection on both sides of the shaft.

9. In an adjusting means for a gauge having a pressure responsive means, a pointer, a shaft on which the pointer is mounted, means connecting the pressure responsive means and shaft to move the shaft, said means including a pivotal connection and a plurality of interengaged threaded members mounted on the shaft to adjust the moving means to cause the pointer to change its direction of swing in response to the same movement of the pressure responsive means, said threaded members being capable of moving the connection across the shaft to obtain adjustments for all positions of the connection on both sides of the shaft.

10. In an adjusting means for a gauge having a pressure responsive means, a pointer, a shaft on which the pointer is mounted, said shaft having an opening, means connecting the pressure responsive means and shaft to move the shaft, said means having a pivotal connection and means mounted in said opening to adjust said moving means to cause the pointer to change its direction of swing in response to the same movement of the pressure responsive means, said last-named means capable of moving said connection through said opening to obtain adjustments for all positions of the connection on both sides of the shaft.

11. In an adjusting means for a gauge having a pressure responsive means, a pointer, a shaft on which the pointer is mounted, and means connecting the pressure responsive means and shaft to move the pointer including a connection, said shaft having an opening, said moving means including a calibrating screw in said opening and a nut for operating said screw, said nut capable of moving said calibrating screw to move said connection across the shaft to change the operation of the moving means and cause the pointer to change its direction of swing in response to the same movement of the pressure responsive means.

12. In an adjusting means for a gauge having a pressure responsive means, a pointer, a shaft on which the pointer is mounted, and means connecting the pressure responsive means and shaft to move the pointer, said moving means including a calibrating screw and nut mounted on the shaft and a connection on the screw, said nut capable of moving said calibrating screw to move said connection across the shaft to change the operation of said moving means and cause the pointer to change its direction of swing in response to the same movement of the pressure responsive means.

13. In a means for calibrating a gauge having a pressure responsive means, a pointer, a shaft on which the pointer is mounted, and means connected with the pressure responsive means and shaft for moving the pointer, the moving means including an adjusting member having a pivot member thereon and means for moving said adjusting member to change the position of the pivot, said third-named means capable of adjustment to change the position of said pivot from one side of the shaft to the other to cause the pointer to change its direction of swing in response to the same movement of the pressure responsive means.

BENJAMIN H. CHISHOLM.